W. P. PENN.
Grain Drill.
No. 27,379. Patented Mar. 6, 1860.
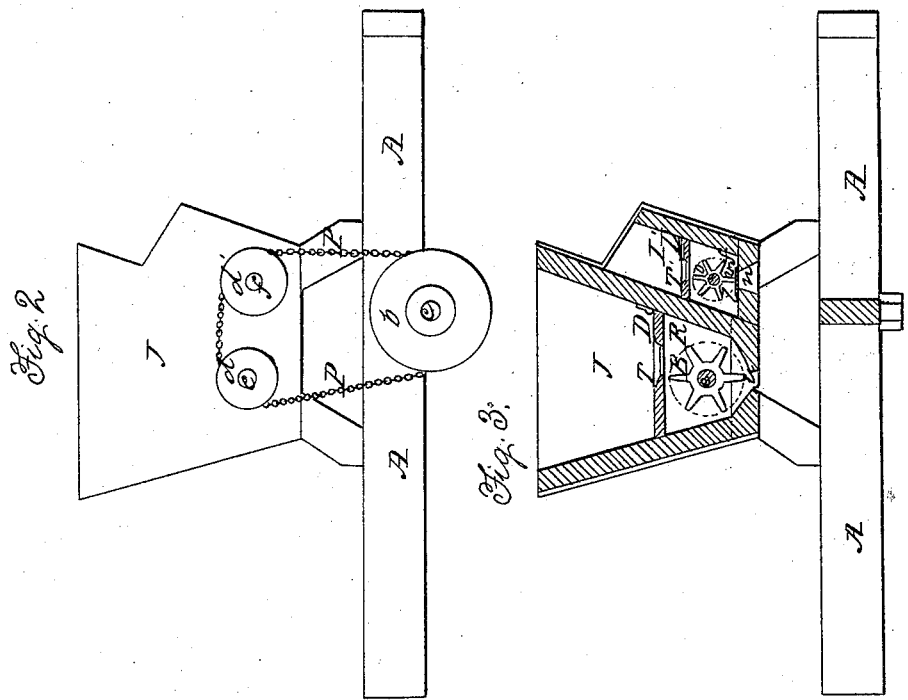
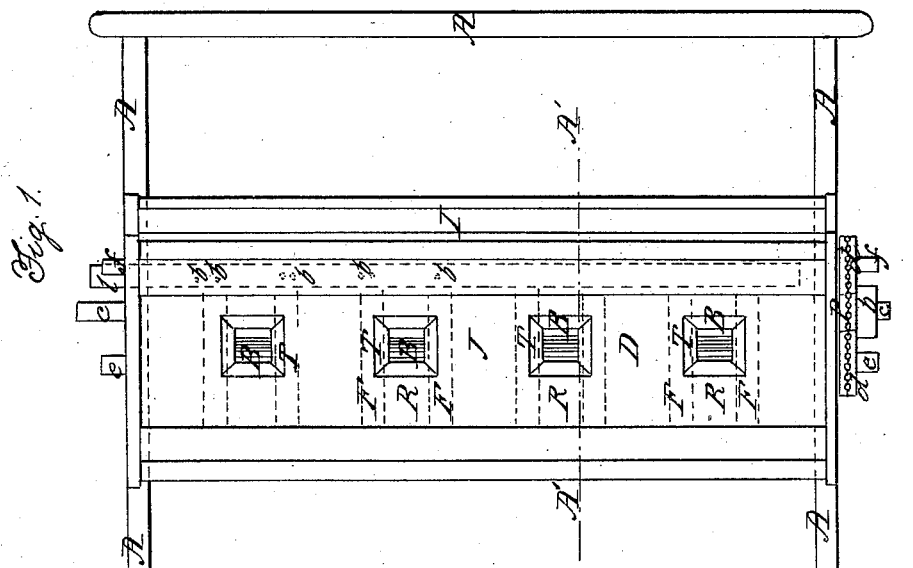
Witnesses:
J. C. Blackwell.
W. H. Stuart
Inventor:
W. P. Penn

UNITED STATES PATENT OFFICE.

WARDEN P. PENN, OF BELLEVILLE, ILLINOIS.

IMPROVEMENT IN SEEDING-MACHINES.

Specification forming part of Letters Patent No. 27,379, dated March 6, 1860.

*To all whom it may concern:*

Be it known that I, WARDEN P. PENN, of Belleville, in the county of St. Clair and State of Illinois, have invented a new and useful Improvement in Seeding-Machines; and I do hereby declare that the following is a full, clear, and exact description of the same, reference being had to the annexed drawings, making part of this specification, in which—

Figure 1 is a top view, Fig. 2 a side elevation, and Fig. 3 a transverse section through the lines A' A'.

As this invention relates to the feeding apparatus of a seeding-machine and the mode of operating the same, I will confine this specification to the improvement only.

The following description will enable any one skilled in the arts to which my invention appertains to make and use the same.

Similar letters of reference represent corresponding parts of the drawings annexed.

A is the frame of the machine, upon which the hopper-box J is fixed. The lower part of the said hopper-box is divided into a number of compartments, R R R, by means of partitions, (shown in dotted lines at F, Fig. 1.) In each one of these compartments a wheel, B, is placed, which is also fixed upon a shaft which runs through the compartment from one end of the hopper-box to the other, as shown at *e*.

I is a grass-seed hopper, which is divided into compartments, the same as the hopper J, and which also has a shaft, *f*, running through it, with wheels *o* upon it, the same as the hopper J.

*u* is a hole in the bottom of the seed-hopper J, and *n* is a hole in the bottom of the hopper I, and in the bottom of this last-named hopper there is a slide, *l*, placed, with two small holes for each of the holes *n*. The object of this slide *l*, with its holes made as aforesaid, is to regulate the flow of seed through the hopper. The said slide is shown in dotted lines, Fig. 1, and the small holes are shown at *v*. A slide of this same character may also be applied to the bottom of the hopper J, if circumstances should make it necessary.

In each of the aforesaid hoppers a false bottom, D D', is placed (either upon hinges or otherwise) close down upon the partitions F. In each of these false bottoms holes are cut at T T', over the wheels B and *o*, to correspond with the holes *u* and *n*.

Upon one end of the shafts *e* and *f* chain-pulleys *d d'* are fixed, which are driven by means of a chain, P, leading from the wheel B upon the main axle C. The wheel B receives its motion from the truck-wheel, upon which the machine is transported. The object of these wheels and chain is to drive the feeding-wheels B and O, and the object of using a chain in the place of cog-wheels is to avoid the necessity of covering up the cog-gearing, which would otherwise have to be used to drive the feeders, and which, if not covered, would become clogged with mud.

The object of the false bottom D is to cause the seed to drop on one side of the face of the feed-wheel only, by which the flow of seed through the machine is made uniform, as it cannot then be jarred through every time the machine strikes a stone or other obstruction, as each one of the wheels B and *o* fills up the compartments between the partitions F F so that the seed cannot get down through the holes *u* and *n* any faster than the wheels carry it to them. The false bottoms are made loose or upon hinges, so that they can be taken out or raised up when it is desired to plant oats, which is a long rough seed, difficult to get through the machine, and needs a constant agitation of considerable violence, and which must be confined in the wheel, so that it can be forced through uniformly.

What I claim as my invention, and desire to secure by Letters Patent, is—

The arrangement of the hoppers J and I, compartments R, partitions F, the false bottoms D and D', shafts *e* and *f*, and feed-wheels B and *o*, all constructed and operated as described.

W. P. PENN.

Witnesses:
H. C. BLACKWELL,
W. H. STUART.